June 6, 1939.                A. W. JEFFERIS, JR                2,161,169
DENTIPHONE
Filed Jan. 24, 1938

Inventor
A. W. Jefferis Jr.
Arthur H. Sturges
Attorney

Patented June 6, 1939

2,161,169

UNITED STATES PATENT OFFICE 2,161,169

DENTIPHONE

Albert W. Jefferis, Jr., Omaha, Nebr., assignor of one-half to Erwin H. Wilson, Omaha, Nebr.

Application January 24, 1938, Serial No. 186,663

8 Claims. (Cl. 179—107)

This invention relates to acoustics and more particularly to audiphones and has for an object to provide means whereby persons having an attenuated sense of hearing may hear normal audible sounds.

A further object of the invention is to provide a dentiphone built into and combined with a denture for use by persons having a hearing sense which is less than normal and who have also lost some or all of their natural teeth.

Other and further objects and advantages of the invention will be understood from the following detailed description thereof:

In the drawing Figure 1 is a transverse vertical elevation of a fragment of a human head showing particularly the mouth portion thereof with the new dentiphone device applied thereto in a position of use.

Figure 1:
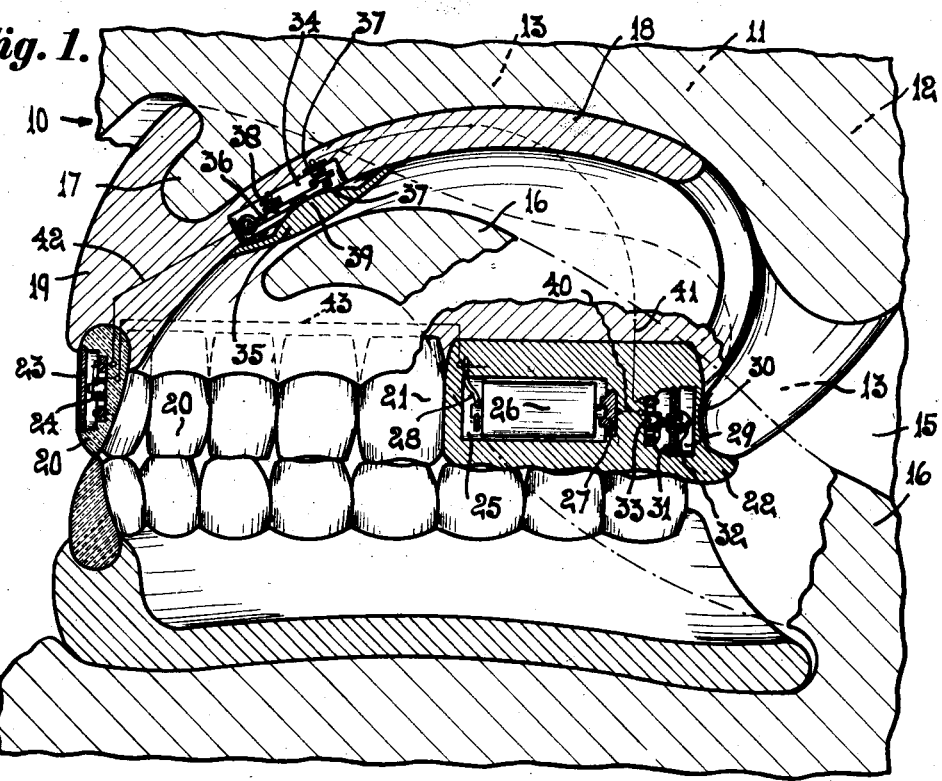

It is known that people who are not totally deaf may enhance their hearing sense by means of a device applied to their natural teeth since Webster's New International dictionary states: "Audiphone—an instrument consisting of a metallic plate, which, placed against the teeth, conveys sound vibrations to the auditory nerve and enables the deaf to hear more or less distinctly."

In cases of total deafness no hearing is possible and the present invention contemplates the provision of means whereby a person having an attenuated sense of hearing may converse with another and receive and understand sound vibrations generated by said other person in a normal conversational tone. There are several media on the market for enabling the partially deaf to hear normal conversational tones which include a housing fastened to the ear and numerous people, while appreciating the use of such devices, nevertheless, object to wearing the same in public for personal and sensitive reasons, and it is a further object of the present invention to provide means for said purposes which is entirely concealed during conversation and public appearance of a user thereof.

In the drawing 10 indicates generally a fragment of a human head having adjacent mouth structure portions including the inferior turbinated bone 11; spheroid bone 12; hard palate 13; uvula 15 and tongue 16.

At the front and lower portion of the hard palate 13 a fleshy gum structure is indicated at 17 within which those ends of the natural incisors of a person are embedded which are in direct communication with tooth nerves. In the practice of the present invention, the natural teeth which are missing are replaced by artificial teeth as to some or all of said natural teeth.

A denture 18 is provided which in a well known manner is made form fitting with respect to the mouth, said denture being formed of suitable insulating substance such as hard rubber or one of the modern plastics which are non-conductive of electrical currents.

The denture 18 at the front 19 thereof carries artificial incisors 20. As outlined in Figure 2, the bottom or tooth carrying portions of the denture is substantially U-shaped and each leg of the U is provided with molars 21, said incisors and molars in conjunction with a set of teeth, artificial or otherwise, carried by the lower jaw are adapted to masticate food.

The denture further includes preferably flanges 22 which in use abut snugly against the mouth skin covering the bone structure of the mouth as shown in Figure 1. The roof of the denture 18 also abuts snugly against the mouth skin portion covering the bone structure of the hard palate 13.

A vibratable diaphragm 23 has its perimeter embedded in one or more of the artificial incisors 20 at the front of the denture. An electromagnetic coil 24 and adjunct parts, when energized, are adapted to actuate later described parts correspondingly with respect to vibrations of the diaphragm 23 and at times when said diaphragm is caused to vibrate by a sound vibration source, such as during conversations, said diaphragm 23 and its adjunct parts comprise a sound pick up which being constructed similar to the well known microphone or telephone transmitter is believed to not require minute description herein.

Figure 2:
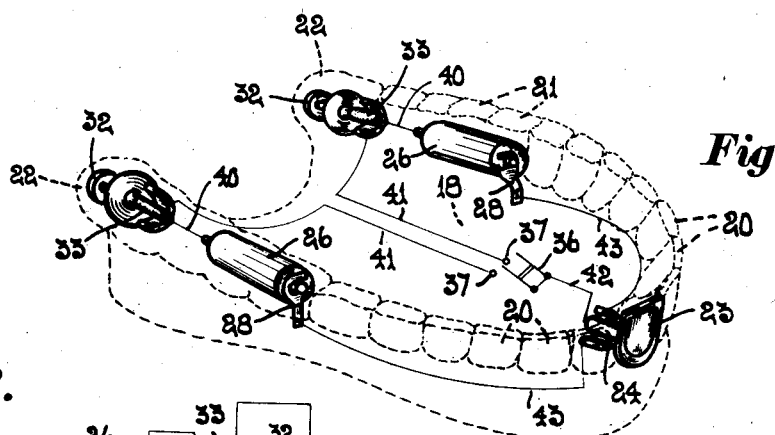
Figure 2 is a perspective view, partly diagrammatic, of an embodiment of the invention.
Figure 3:
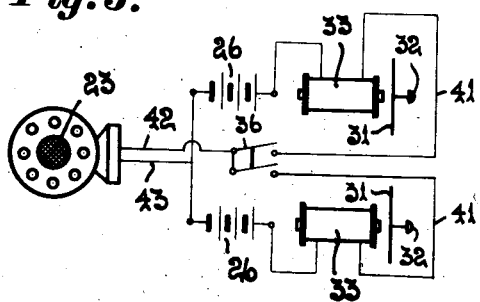
Figure 3 is a wiring diagram.

As shown in Figure 1, certain of the artificial molars 21 are provided with a recess 25 for receiving a battery 26. Preferably two batteries are employed as shown in Figure 2 and if desired four batteries may be employed, and one or more of said batteries may be embedded in the molars as shown or other suitable parts of the denture. One of the terminals of each of the batteries 26, as shown in Figure 1, are in contact with a suitable electrode 27, the latter having a groove whereby said terminal is slidable longitudinally in the groove. The openings of said recesses 25 preferably face inwardly or toward each other. The other terminals of the batteries 26 are removably secured to clip-electrodes 28 which, as best shown in Figure 2, are provided with bifurcated ends whereby at times when the battery becomes weakened through use it may be readily removed and a new one substituted. In use after the batteries are seated within the recesses 25 and in electrical communication with the contacts or electrodes 27 and 28, the space of the recesses 25 which are not occupied by the batteries are filled with a removable composition which is initially semi-plastic for the purpose of preventing saliva from coming in contact with the terminals of the battery, said composition preferably consists of the substance used by dentists for temporary cavity filling purposes and which is commercially known to the dental art as guttapercha temporary stopping.

The flanges 22 of the denture are preferably provided whereby contact with a comparatively large area of the upper jaw bone is assured, said flanges are provided with chambers 29 having a comparatively thin wall 30, said chambers being provided in the molars disposed at the ends of the legs of said U-shaped denture or other suitable portion of the latter.

Vibratable diaphragms 31 having their perimeters embedded in the adjacent walls of respective chambers 30 are transversely disposed across the latter. The diaphragms 31 are preferably each provided with a medially disposed lug 32, said lugs being adapted to contact with respective walls for purposes later described and, if desired, the walls 30 of each chamber 29 may be provided with a boss adapted to contact with a diaphragm in lieu of the latter carrying said lugs. The electro-magnetic coils and their adjunct parts 33 are adapted to cause the diaphragms 31 to vibrate in a well known manner at times when a circuit is closed through said coils, the latter and the diaphragms together with their adjunct parts comprising receivers. The mechanism of the receivers is conventional and believed to not require particular description.

In the roof, preferably of the denture 18, a chamber 34 is provided by means of forming a recess in said roof and covering the open side of said recess with a flexible cover 35 for providing a sealed chamber for preventing saliva from entering therein. The flexible cover 35 is formed of thin rubber or the like having its perimetrical edges cemented to said roof.

In instances where two receivers are combined with a denture a double pole type switch is provided as outlined in Figure 2. The switch includes a pivotally mounted lever 36 and two oppositely disposed electrodes or contact buttons 37. The lever 36 is normally maintained out of contact with the electrodes 37 by means of the urge of a spring 38. The flexible cover 35 is provided with a boss 39 which bears against the lever 36 whereby at times when the operator desires to close the switch he may readily do so by pressing his tongue 16 against the flexible cover 35.

Circuit wires 40 are disposed between and are in electrical communication at times with the battery electrodes 27 and the coils 33 of the receivers and a circuit wire 41 extends from each electrode 37 of the switch to the adjunct parts of each coil 33 as diagrammatically illustrated in Figure 2.

A circuit wire 42 extends between the switch lever 36 and the adjunct parts of the coil 24 of the sound pick up. Similarly circuit wires 43 extend from the coil 24 of the sound pick up to the bifurcated electrodes 28 which are in contact with their respective batteries 26. The said circuit wires are all embedded in the insulating material of the denture or in the insulating porcelain of the artificial teeth thereof for preventing short circuits and also preventing contact of saliva therewith.

Preferably but one sound pick up is employed although obviously if more than one sound pick up is included in the denture the wiring for energizing the same may be arranged accordingly.

In use the device is oriented in the mouth for mastication purposes in a well known manner and assuming that the sense of hearing of a user thereof is attenuated or less than normal and he engages in conversation with another person, he may close an electrical circuit through the various heretofore mentioned parts by means of pressing his tongue against the flexible cover member 35 for closing the switch and circuit whereby the sound vibrations generated by the person with whom he is conversing causing the diaphragm 23 to vibrate responsively, causes a corresponding vibration of the diaphragms 31 of the receivers, said vibrations thereby becoming impressed on the auditory sense or organs of the operator, primarily through or in conjunction with bone structure of the mouth.

It will be understood that if desired the diaphragms 31 may be placed in direct contact with the mouth skin covering of the hard palate or adjacent parts of the mouth. Preferably the diaphragms 31 and their adjunct parts are placed in sealed chambers for preventing food particles from lodging against the diaphragms.

It is obvious that various changes and modifications may be made in the details of construction and design of the above specifically described embodiment of this invention without departing from the spirit thereof such changes and modifications being restricted only by the scope of the following claims.

I claim:

1. A device for amplifying the audibility of sounds comprising a denture having a plate portion formed of insulating material and artificial molars and incisors secured to said plate, a sound pick up carried by said incisors, said plate provided with a chamber having a flexible wall, a switch in said chamber, resilient means for causing said switch to be normally open, said switch adapted to be closed by pressure of the tongue of a user of said denture against said flexible wall, said plate portion having a flange adapted to abut snugly against the mouth skin covering the bone structure of the palate of the mouth of said user, a receiver including a diaphragm embedded in said flange, said diaphragm adapted to vibrate against a portion of said flange, circuit wires in said denture between said sound pick up, switch and receiver, a battery removably sealed in said denture for energizing said circuit, said pick up adapted to vibrate responsive to a sound vibration source at times when said switch is closed for causing corresponding vibrations of said diaphragm to be applied to said flange portion for impressing facsimiles of said sound vibrations on the auditory organs of an auditor-user of said denture.

2. A dentiphone having, in combination a denture provided with a shape conforming to mouth surface portions of a particular person, said denture adapted to be placed in juxtaposition with respect to the bone supporting structure of said portions in said mouth, a vibratable sound pick up, a receiver, a normally open switch, a battery and electrodes carried by said denture, said electrodes arranged to provide a normally open circuit between said parts, said sound pick up adapted to vibrate responsively to a sound vibration source, said receiver having a diaphragm adapted to vibrate correspondingly with respect to vibrations of said pick up, said diaphragm adapted to impress counter parts of said sound vibrations on said denture and bone at times when said denture is in said position and said switch is closed.

3. In an auditory device comprising a denture including a plate and artificial teeth, a vibratable sound pick up carried by said teeth adjacent the front of said plate, a diaphragm carried by said plate adjacent the rear of the latter, a normally open switch carried by said denture adapted to be closed by the tongue of an operator, a battery removably disposed in said denture, means including said switch, battery and an electrical circuit for causing said diaphragm to vibrate correspondingly with respect to said sound pick up and responsively to a sound vibration source at times when said switch is closed, and means for impressing said responsive vibrations on the auditory sense of an operator for amplifying the audibility of sound vibrations of said sound source.

4. In a dentiphone, the combination of a denture having a shape complemental to mouth portions of an individual user, said denture adapted to be oriented for mastication purposes with respect to the supporting bone structure of said portions, a vibratable sound pick up, electrically energized means for causing said pick up to vibrate responsively to a sound vibration source, and means for impressing said vibrations on the auditory sense of said user.

5. The combination with a denture, of means mounted thereon and adapted to vibrate responsively with respect to a sound vibration source, electrically energized means carried by said denture for impressing said responsive vibrations on the auditory sense of a user of said denture for amplifying the audibility of said sound, and means associated with said denture movable by the tongue of said user for governing impressions.

6. The combination with a denture, of electrically energized means carried thereby for impressing sound vibrations on the auditory sense of a user of said denture.

7. A new article of manufacture comprising a denture having a plate portion and artificial molars and incisors carried thereby, certain of said molars having disposed therein a recess adapted to receive a battery, and electrodes carried by the denture having ends terminating in said recess adapted to be connected to said battery.

8. A new article of manufacture comprising a denture having a plate portion and artificial molars and incisors secured thereto, said denture provided with a recess adapted to receive a battery therein, electrodes carried by the denture having ends terminating in said recess, said ends adapted to be connected to said battery.

ALBERT W. JEFFERIS, Jr.